Sept. 18, 1945.   R. R. HAUGH   2,384,998
HEATING METHOD
Filed Dec. 16, 1939   4 Sheets-Sheet 1
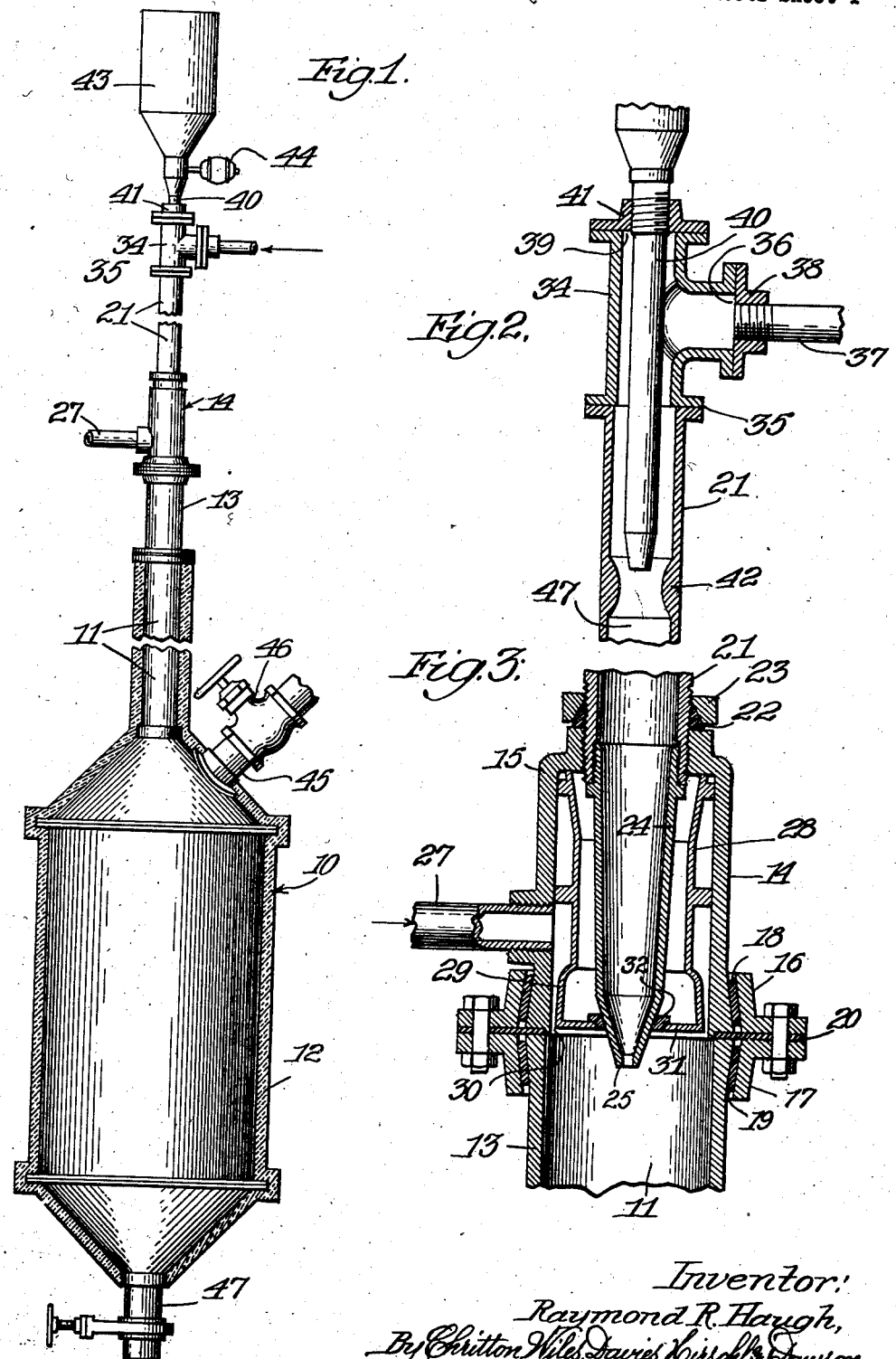
Inventor:
Raymond R. Haugh,
By Chritton, Wiles, Davies, Kirschl & Dawson,
Attys.

Sept. 18, 1945.   R. R. HAUGH   2,384,998
HEATING METHOD
Filed Dec. 16, 1939   4 Sheets-Sheet 2
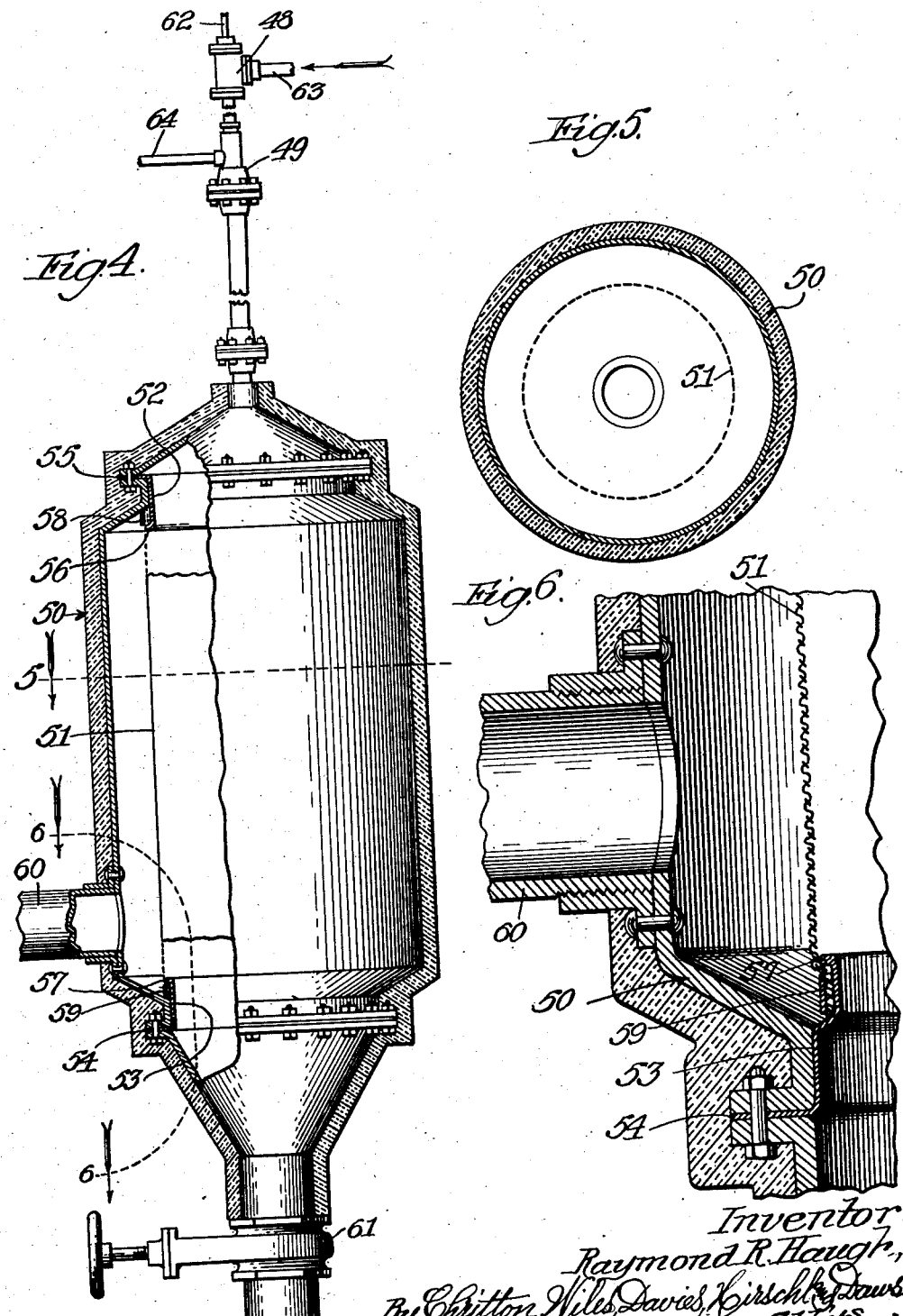
Inventor:
Raymond R. Haugh,
By Chritton, Wiles, Davies, Hirsch & Dawson,
Attys.

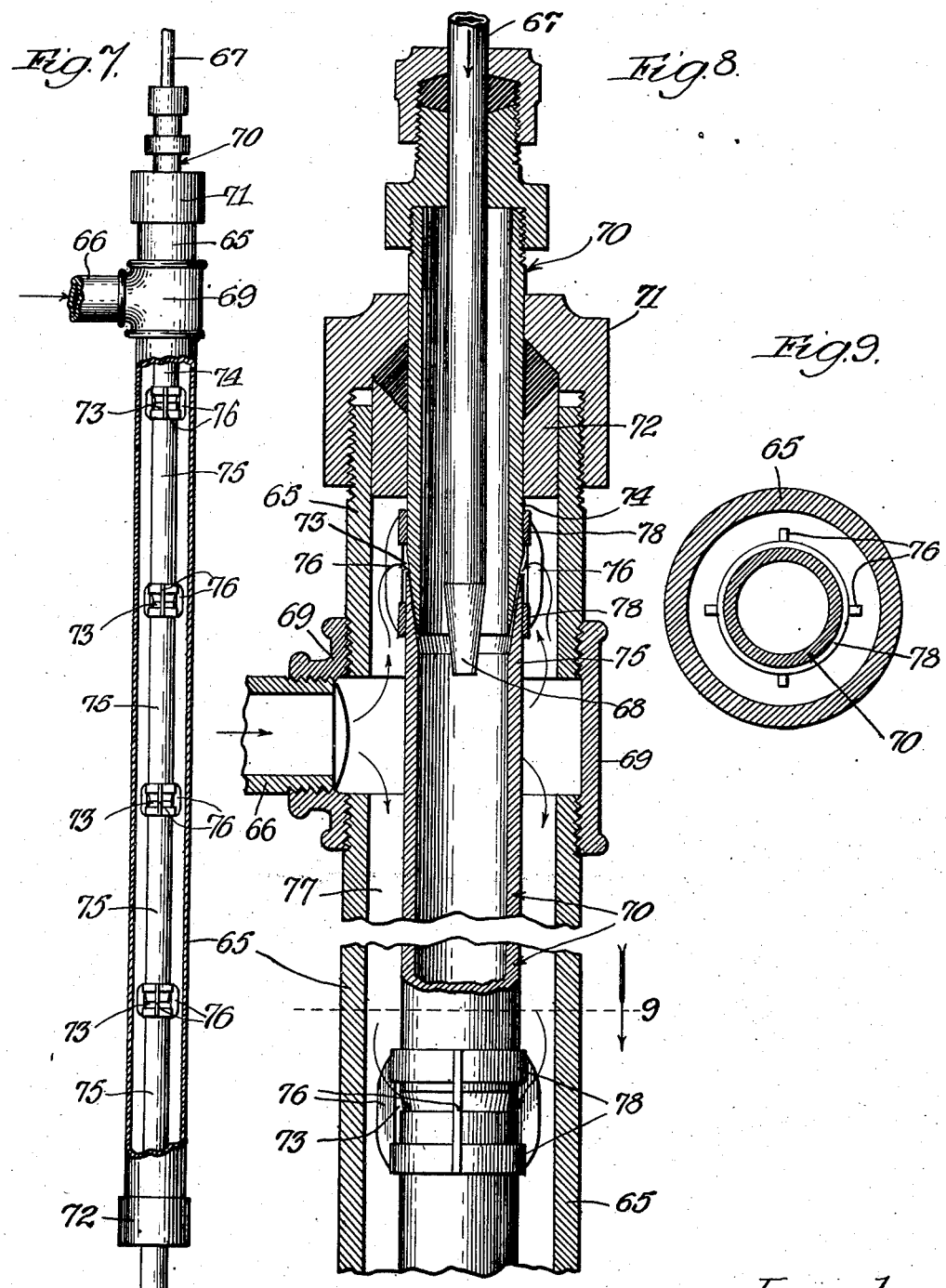

Sept. 18, 1945.  R. R. HAUGH  2,384,998
HEATING METHOD
Filed Dec. 16, 1939  4 Sheets-Sheet 4
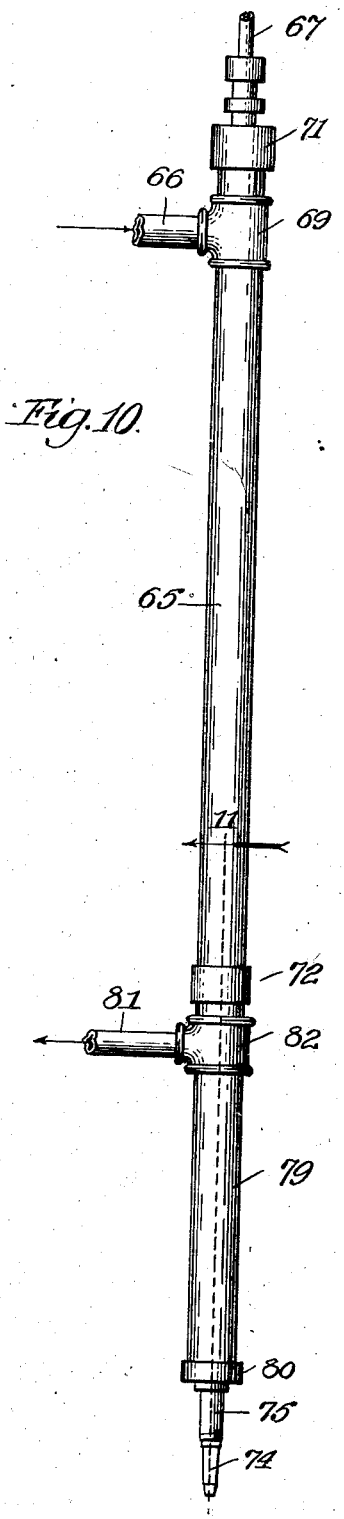
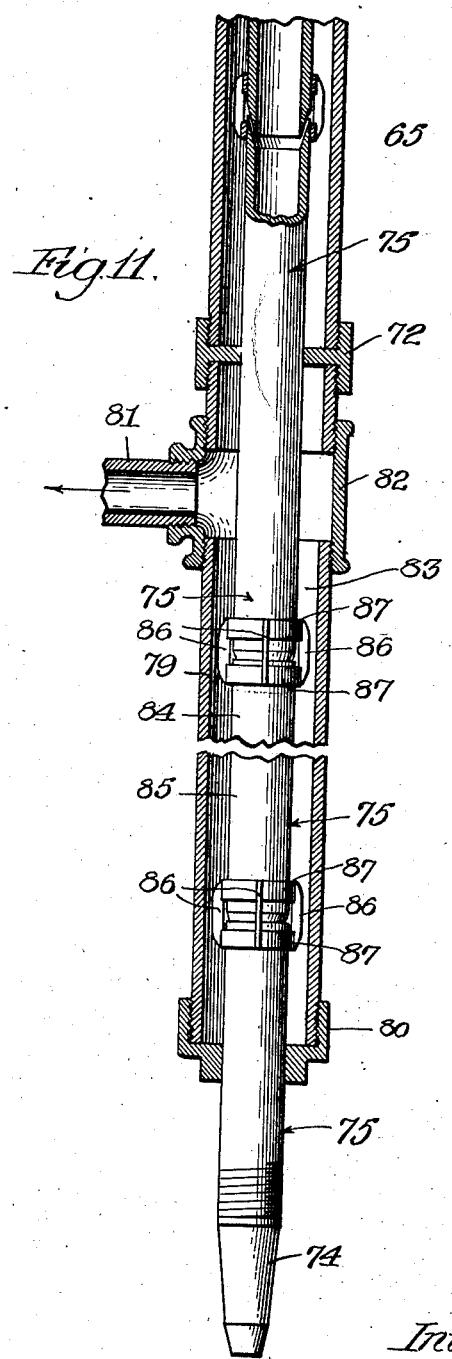
Inventor:
Raymond R. Haugh,
By Chritton, Niles, Davis, Kirschl & Dawson,
Attys.

Patented Sept. 18, 1945

2,384,998

UNITED STATES PATENT OFFICE 2,384,998

HEATING METHOD

Raymond R. Haugh, Chicago, Ill., assignor to Vernon C. Usher, Chicago, Ill.

Application December 16, 1939, Serial No. 309,691

6 Claims. (Cl. 159—48)

This invention relates to a heating method and apparatus and more particularly to the treatment of materials with superheated steam or other gaseous heating medium.

An object of this invention is to provide for the heating and drying of materials. A further object is to provide a simple and easy method for preparing dried food products. Another object is to provide colored flour and egg products. Still another object is to gelatinize flour. Yet another object is to pasteurize and sterilize various materials, particularly food products. A further object is to provide for quick and rapid drying of materials without causing deterioration thereof. Another object is to provide for the separation of treated materials immediately after drying. Still a further object is to provide a method and apparatus for treating materials with superheated steam. Other features and advantages will be apparent from the following specification and drawings, in which—

Fig. 1 is a side elevational view of a structure embodying my invention, with the insulation on the container shown in section; Fig. 2 is a fragmentary sectional view showing the premixing chamber; Fig. 3 is a fragmentary sectional view of the inlet system; Fig. 4 is a side elevational view, partly broken away, of a modified form of apparatus; Fig. 5 is a sectional view along the line 5 of Fig. 4; Fig. 6 is a detail sectional view of the portion of the apparatus of Fig. 4, indicated by the line 6—6; Fig. 7 is a side elevational view, partly broken away, of a modified form of mixing chamber; Fig. 8 is a fragmentary, longitudinal sectional view of the same chamber; Fig. 9 is a sectional view taken along the line 9 of Fig. 8; Fig. 10 is a side elevational view of a modified form of mixing chamber, including the chamber shown in Figs. 7, 8 and 9; and Fig. 11 is a fragmentary sectional view taken along the line 11 of Fig. 10.

The method and apparatus are particularly adapted for the drying of food products. My invention makes it possible to cause such drying to occur quickly and practically instantaneously. This is true over a wide range of temperatures which may be chosen for the operation.

The temperature and the pressure may be varied according to the material used and the result which it is desired to produce. For example, in the treatment of flour, it is desirable to sterilize and color the flour. Sterilized flour is of great value in the baking field, since a sterile media is provided for the fermentation of the dough, while at the same time both the fermentation of the dough and the flavor of the finished product is readily controlled. In this sterilizing operation, it is usually desirable to use a relatively high temperature. For example, the flour is preferably brought to a temperature of 212° F. When such a temperature is used, it is, of course, unnecessary to use a high vacuum, although it is possible to use such a vacuum if desired.

On the other hand, in the treatment of other products such as eggs, either the yolks, albumen or whole eggs, a high temperature is undesirable, and the operation may be carried out at a relatively low temperature such as 100° F. and under a high vacuum. The same is true when it is desired to produce a dried soluble yeast product.

My invention is useful in the treatment of vegetable and cereal flours such as wheat flour or pumpkin, soy bean, pea or potato flour. Meat and fish flours, as well as products such as cocoanut flour, banana flour, and miscible fruit flours may also be readily treated in accordance with my invention.

In the embodiment of my invention shown in Figs. 1, 2 and 3, a container 10 and an elongated mixing chamber 11 associated with the container are both provided with insulation 12 to prevent heat transfer therethrough. To the upper end of the chamber 11 is secured a pipe 13 joining and supporting the inlet system 14.

As seen particularly in Fig. 3, the inlet system 14 includes a casing 15 maintained in position by flanged annular retaining members 16 and 17 and resilient gaskets 18, 19 and 20. The casing 15 threadedly receives a pipe 21 which is secured in position by a washer 22 and lock nut 23. Threaded to the inner portion of the pipe 21 is a nozzle 24 provided at its end with a small orifice or jet 25 which extends into the mixing chamber 11.

Into one side of the casing 15 the steam inlet pipe 27 is threadedly inserted and is separated from the nozzle 24 by the insulating member 28. The lower portion 29 of the insulating member 28 is so constructed as to approach the walls of the casing 15, leaving a small peripheral opening 30 communicating with the chamber 11. The portion 29 is provided at its lower end with an inwardly turned flange 31 which engages the washer 32 encircling the nozzle 24. The insulating member 28 is preferably spaced away from the nozzle 24 in order that the air space between the two parts may increase the insulating effect. The pipe 27 communicates at its other end with a source of superheated steam or other gaseous heating medium (not shown).

As seen particularly in Fig. 2, the pipe 21 is joined to the T-shaped tube 34 by a conventional joint 35. The opening 36 serves to provide for the introduction of steam into the pipe 21 and is connected to the steam inlet conduit by a fitting 38. The other opening 39 of the T-shaped tube 34 receives an inlet pipe 40 which is fixed in position by the air-tight seal of the closure member 41.

The inlet pipe 40 extends downwardly through the T-shaped tube 34 and terminates adjacent the portion 42 of the pipe 21 which is reduced in cross section, thus forming in effect a Venturi passage. The inlet pipe communicates with the hopper 43, from which the flow of material is controlled by the valve 44. The material to be treated is thus placed in the hopper 43 prior to the operation of the apparatus.

The container 10 is preferably provided with an outlet pipe 45 having a manually controlled valve 46. By means of this outlet the container may be evacuated or partially evacuated during the operation of the apparatus. A gate valve 47 at the lower end of the container permits the removal of treated material.

In operation, the material to be treated may be placed in the hopper 43. The apparatus is adapted for use with any type of material which it is desired to heat or to dry and is particularly useful for the treatment of flour. From the hopper 43 the flour or other material passes through the inlet pipe 40 to the Venturi passage 42. At the same time, the superheated steam, flowing from the conduit 38, reaches the Venturi passage 42 by the pipe 21. Only a relatively small amount of superheated steam is permitted to flow through the pipe 21 into contact with the flour. However, the quantity of steam should be sufficient to cause gelatinization of the flour.

From the pipe 21 the gelatinized flour passes to the nozzle 24 and out through the jet 25 and into the mixing chamber 11. Superheated steam flowing from the pipe 27 passes through the annular opening 30 and is brought into contact with the flour. Since the opening through which the superheated steam is introduced surrounds the flour jet, the steam serves to keep the flour from coming in contact with the walls of the mixing chamber 11.

The mixture of flour and superheated steam passes downwardly through the chamber 11 into the container 12. In the course of this movement the flour is thoroughly dried by the steam, and a large portion of the steam is desuperheated. The flour is then collected in the lower portion of the container 10 and the desuperheated steam removed through the pipe 45, which may be subjected to a vacuum. If the container is subjected to a vacuum, the action is, of course, more rapid, since the superheat of the steam becomes greater. The treated material may be removed from the container 10 by means of the gate valve 47.

By means of this treatment with superheated steam, the flour is sterilized and scalded and may, in addition, if desired, be colored. The superheated steam quickly raises the temperature of the material with which it is brought in contact and may after the heating operation be readily removed from such contact.

The premixing of the flour with superheated steam in the chamber 47a serves to add moisture to the flour and to cause it to be gelatinized. Thereafter, when the gelatinized flour is treated with an excess of superheated steam, the moisture in the flour is vaporized and the flour completely dried as well as sterilized. If a large amount of superheated steam is used or if the temperature of the steam is unusually high, the flour may readily be slightly carbonized to cause it to be colored. At the same time the flour is toasted and its flavor improved.

By quickly and uniformly raising the temperature of the flour in this manner the flour is sterilized and bacteria and other organisms destroyed. Obviously, the same process may be used to sterilize vegetables, fruit, legumes, tobacco, and other materials.

The temperature to which the steam is heated is preferably in the neighborhood of 400° F., but may, if desired, be considerably lower. In fact, when used with a relatively high vacuum, the steam has been found to satisfactorily perform its function at a temperature of 175° to 200° F. In general, it may be said that the temperature of the steam, the pressure in the container, and reaction of time necessary may be varied considerably, depending upon the purpose which is to be accomplished.

The modification of my invention as shown in Figs. 4, 5 and 6 is particularly adapted for use with liquids and may be very satisfactorily used for the drying of material. In this modification as shown, the premixing chamber 48 with the Venturi passage and the inlet system 49 are substantially the same as the premixing chamber 34 and inlet system 14, respectively. The container 50 is also very similar to the container 10, as previously described. However, the container 50 is provided with a filter or screen 51 preferably made of cloth, which encircles the main portion of the container 50 and serves to aid in collecting the treated products.

The filter 51 may be secured to the container 50 in any suitable manner. As illustrated, a pair of flat annular rings 52 and 53 are provided with outwardly turned flanges 54 and 55 by means of which the rings are secured to the container 50. At their opposite ends the rings 52 and 53 are provided with outwardly turned flanges 56 and 57 over which the filter may pass. Additional rings, 58 and 59, fitting tightly upon the rings 52 and 53, serve to retain the cloth filter in position.

The container 50 is provided with an opening 60 by means of which the container may be subjected to evacuation. The opening 60 is preferably positioned within the container in such a manner that any material in the container will have to pass through the filter 51 in order to reach the opening 60. A gate valve 61, at the lower end of the container 50, permits the removal of the finished product.

In the operation of my invention shown in the modification of Figs. 4, 5 and 6, milk or other liquid is delivered through the pipe 62 to the mixing chamber 48 into which a small quantity of superheated steam is simultaneously introduced. The steam and milk are mixed in the chamber 48, quickly raising the temperature of the milk. The quantity of steam introduced is preferably such that the milk will not be heated above 190°–200° F. The premixed or preheated milk is then passed to the inlet system 49 where it is brought into contact with an excess of superheated steam in a manner similar to that described in connection with the flour and the inlet system 14. The contact with the superheated steam causes the milk to be rapidly dried and the steam desuperheated.

Preferably the milk is caused to flow through the pipe 62, chamber 48 and inlet system 49 under a substantial pressure. In this manner the milk passing through the jet of the inlet system is sprayed into the mixing chamber and a more thorough and rapid mixing accomplished. The milk product is collected in the lower portion of the container while the desuperheated steam passes out through the opening 60.

If desired, it is possible to eliminate the step of premixing or preheating the milk with superheated steam. Instead of this operation the milk may be slowly and carefully heated by any suitable means to a temperature not in excess of 180°–190° F. and then passed directly into the inlet system of my apparatus. On the other hand, in some instances it may be desirable to dispense with the preheating operation entirely. As in the case of the embodiment of my invention shown in Figs. 1, 2 and 3, this last described modification may be used under various conditions of time, pressure and temperature, depending upon the results which it is desired to produce.

The modification of my invention shown in Figs. 7, 8 and 9 relates to a mixing chamber of a type which it is possible to substitute for the mixing chamber 11 shown in Fig. 1.

One of the chief difficulties encountered in the heating and drying of liquids is that of preventing the liquid from drying on the walls of the mixing chamber. My modified mixing chamber eliminates this and other difficulties and is particularly adapted for use in the mixing of liquids with superheated steam.

My modified mixing chamber includes a casing or pipe 65 equipped with a steam inlet pipe 66 and a liquid inlet pipe 67, the latter being provided with a small jet opening at its end. The pipe 66 is joined to the casing 65 by means of any suitable fitting 69. The casing 65 receives a tube 70 which is secured in position by fittings 71 and 72.

The tube 70 is provided with a series of spaced openings 73 throughout its length. These openings 73 communicate with the inside of the tube 70 at a rather sharp angle to the surface of the walls thereof and are adapted to permit the introduction of gas into said tube, the gas flowing in the same direction as that of the movement of liquid within the tube.

The openings 73 preferably extend completely around the tube 70. In effect, this means that the tube 70 must consist of a series of sections. Thus the section 74 is provided with an inwardly tapered lower end, while the section 75 has an outwardly tapered upper end. The sections 74 and 75 are joined by straps 76 on the ring members 78 or by any other suitable type of mounting. The lower end of the section 75 is also tapered inwardly and cooperates with the outwardly tapered upper end of the next section 75 to provide for the next lower opening 73.

In operation, the liquid passes through the inlet pipe 67 and is ejected from the jet 68 in the form of a spray. Simultaneously superheated steam or other gas heating medium flows into the apparatus through the inlet pipe 66, being received within the chamber 77 around the tube 70. The superheated steam thereafter passes into the tube 70 through the annular openings 73, a portion of the steam being successively ejected through each of said openings 73. In this manner the superheated steam is mixed with the liquid within the tube.

Since the superheated steam is received along the inner surface of the tube 70 and moves in the same direction within the tube as does the liquid therein, the spray of liquid within the tube is encircled by the superheated steam and prevented from coming into contact with the walls of the tube 70. This feature causes the liquid to pass into the container without accumulating on the walls of the mixing chamber and without being subjected to deteriorating effects.

The invention shown in Figs. 7, 8 and 9 may be further modified as seen in Figs. 10 and 11. As seen particularly in Fig. 10, the construction of the modification of Figs. 7, 8 and 9 includes a casing 65, a steam inlet 66 joined to the casing by the fitting 69, and a liquid inlet 67. The casing is maintained in position by fittings 71 and 72 at the upper and lower ends thereof.

The tube 75 extends through the casing 65, and, in the modification shown in Figs. 10 and 11, may extend downwardly through the casing 79. The casing 79 may be secured at its upper end to the fitting 72 just below the casing 65, and at its lower end to the fitting 80. An outlet pipe 81, adapted to be secured to any suitable means for drawing a vacuum, communicates with the casing 79 through the fitting 82. Within the casing 79 the tube 75 may be broken into a series of sections 83, 84 and 85 similar in construction to the sections of the tube 75 within the casing 65. As in the casing 65, these sections are joined by straps 86 mounted on the ring members 87. The lower end of the tube 75 is joined to the nozzle 24, which nozzle is also shown in the preferred embodiment of my invention as seen in Fig. 3.

In operation, the steam and the material to be dried are mixed within the tube 75 within the casing 65. The mixture flows downwardly through the tube 75 to that portion of the tube which is enclosed by the casing 79. At this stage of the operation, the steam, having already been in contact with the material to be dried, has begun to cool and shows a tendency to condense. However, the vacuum drawn in the casing 79 through the outlet 81 serves to reduce the pressure through the openings between the sections of the tube 75. Because of the type of construction used in these sections, the mixture does not escape out of the tube 75 into the chamber 79 to any appreciable extent, but it is nevertheless possible to withdraw a portion of the water vapor and reduce the pressure within the tube 75. This operation serves to increase the superheat of the steam and to increase its effectiveness.

Of course, in the preferred embodiment of my invention, as seen particularly in Fig. 1, it is possible to reduce the pressure in the chamber 10 through the vacuum outlet 45. However, the modification of my invention shown in Figs. 10 and 11 is particularly adapted to prevent any appreciable differential in pressure existing between the tube 75 and the chamber 10 as would normally be the tendency because of the cooling which occurs in the tube 75.

While there are shown and described certain embodiments of the invention, it is to be understood that it is capable of many modifications. Changes, therefore, in the construction and arrangement may be made without departing from the spirit and scope of the invention as disclosed in the appended claims, in which it is intended to claim all novelty inherent in the invention as broadly as permissible, in view of the prior art.

I claim:

1. A method for drying liquids, comprising passing preheated liquid in spray form into and longitudinally through a casing, annularly introducing superheated steam into the casing at relatively and definitely spaced intervals throughout the length thereof in the same direction of travel of said matter and in a manner to effect flowing of the steam over and longitudinally along the inner faces of the side walls of the casing, and finally, passing the dried matter from the discharge end of the casing.

2. A method for drying liquids, comprising passing preheated liquid in spray form into and longitudinally through a casing, annularly introducing superheated steam into the casing at relatively and definitely spaced intervals throughout the length thereof in the same direction of travel of said liquid and in a manner to effect flow of the steam entirely over and along the inner faces of the side walls of the casing, and finally, passing the dried matter from the discharge end of the casing.

3. A method for drying liquids, comprising passing a liquid in spray form into and longitudinally through a casing, annularly introducing superheated steam into the casing at relatively and definitely spaced intervals throughout the length thereof in the same direction of travel of said mixture and in a manner to cause longitudinal flow of the steam over and along the inner faces of the side walls of the casing and from its discharge end.

4. A method for drying liquids, comprising passing preheated liquid in spray form into and longitudinally through a casing, annularly introducing superheated steam into the casing at relatively spaced intervals throughout the length thereof whereby to provide succeeding drying zones and causing said steam to flow longitudinally through the casing over and along the inner faces of its side walls, and finally, discharging the dried matter from the discharge end of the casing.

5. A method for drying liquids, comprising passing a liquid in spray form into and longitudinally through a casing, annularly introducing superheated steam into the casing at relatively and definitely spaced intervals throughout the length thereof in the same direction of travel of said liquid and in a manner to cause longitudinal flow of the steam over and along the inner faces of the side walls of the casing, the pressure of said steam being greater than that of the sprayed liquid, and finally, passing the matter from the discharge end of the casing beyond the points of introduction of the steam thereinto.

6. A method for drying liquids, comprising passing liquid in spray form into and longitudinally through a casing, annularly introducing superheated steam into the casing at relatively and definitely spaced intervals throughout the length thereof in the direction of travel of said liquid and in a manner to cause longitudinal flow of the steam over and along the inner faces of the side walls of the casing, evacuating vapors of the superheated steam from the casing at a point in proximity to the discharge end thereof, and finally, passing the dried matter from the discharge end of the casing beyond the point of evacuation of vapors and the points of introduction of superheated steam into the casing.

RAYMOND R. HAUGH.